Oct. 24, 1933.    R. S. FALKINER    1,931,531
FLEXIBLE TRACKWAY
Filed Aug. 19, 1931    2 Sheets-Sheet 1
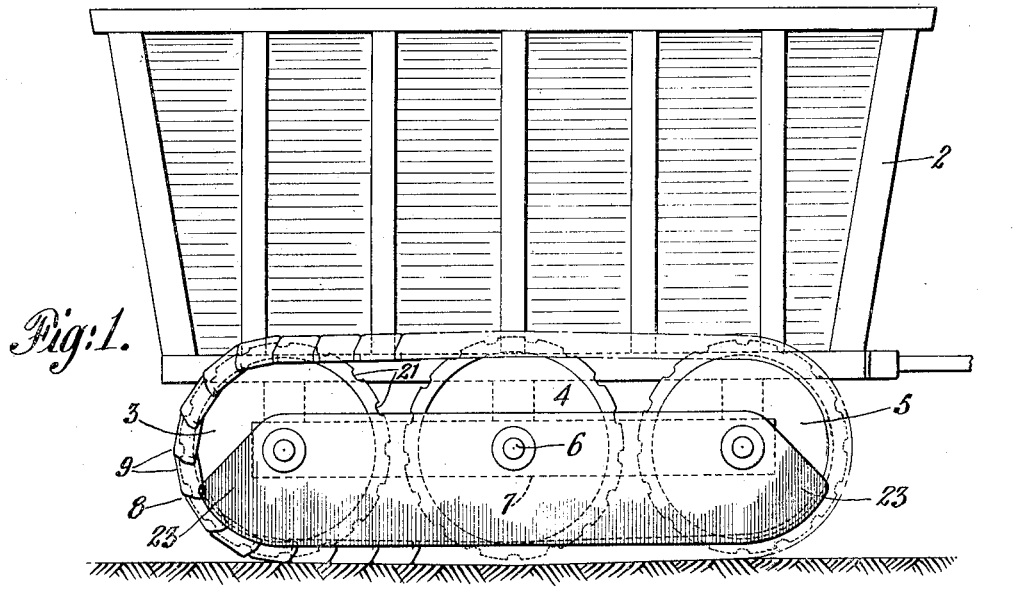
Fig. 1.
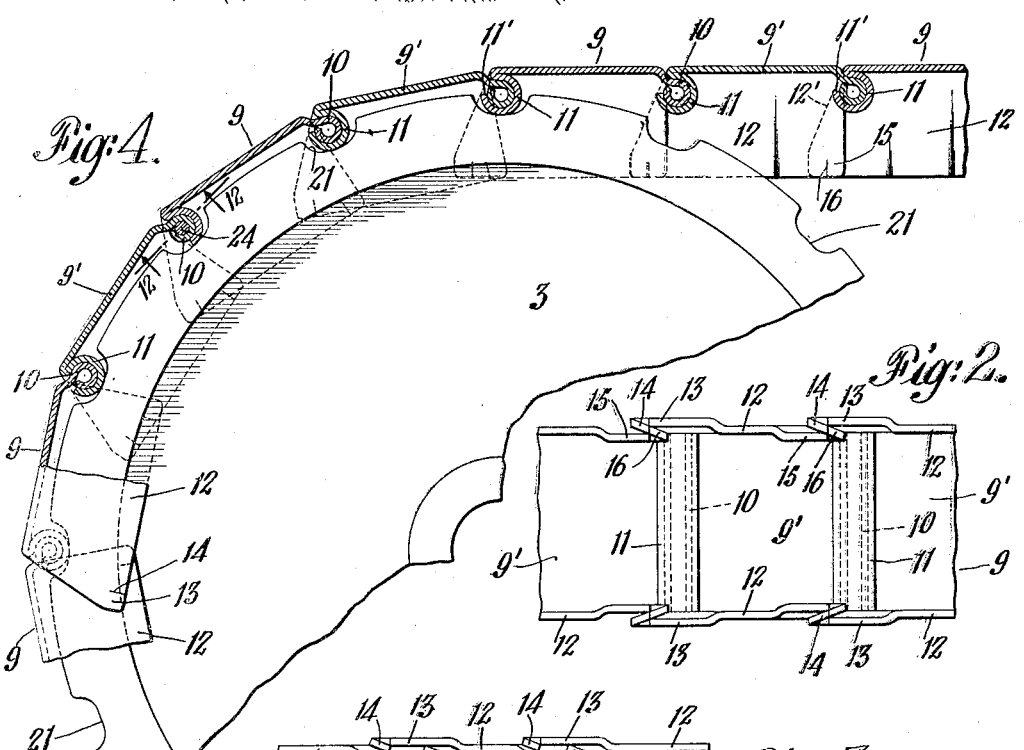
Fig. 4.
Fig. 2.
Fig. 3.
INVENTOR
RALPH SADLEIR FALKINER
BY
E. C. Sanborn
ATTORNEY Oct. 24, 1933.   R. S. FALKINER   1,931,531
FLEXIBLE TRACKWAY
Filed Aug. 19, 1931   2 Sheets-Sheet 2
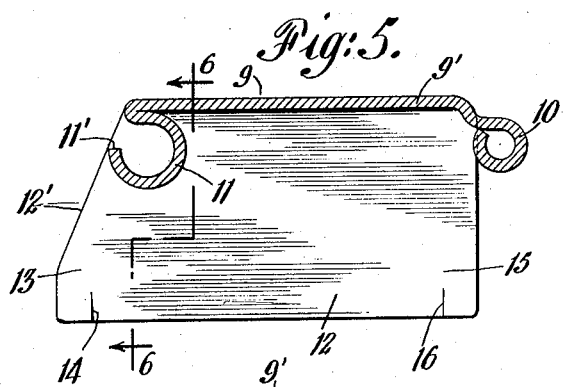
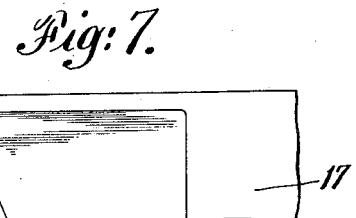
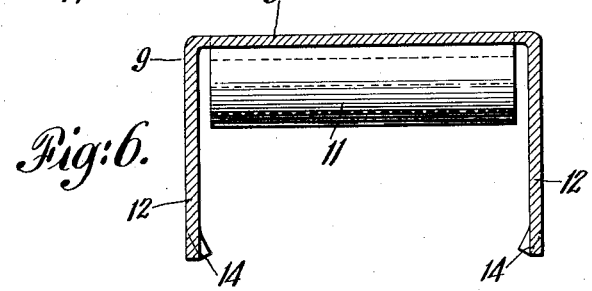
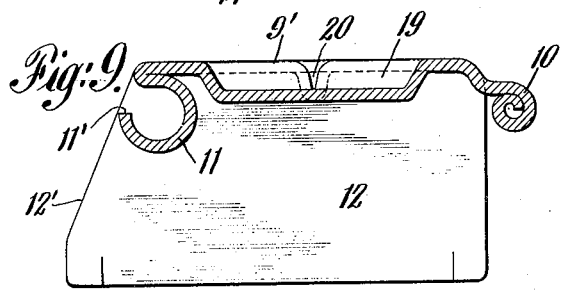
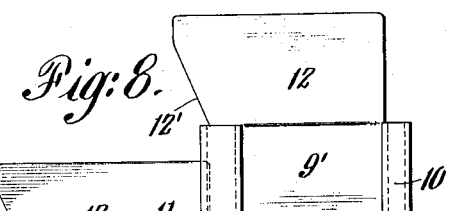
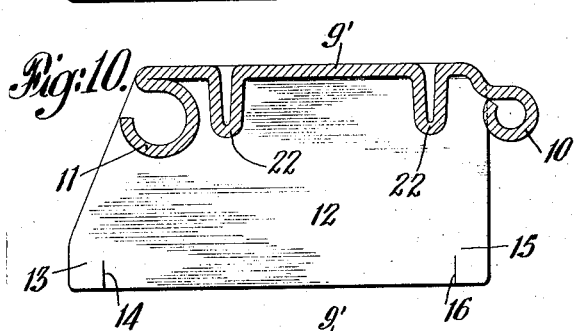
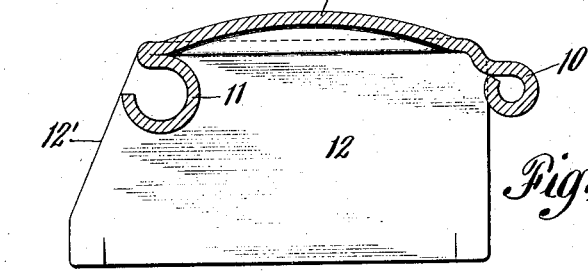
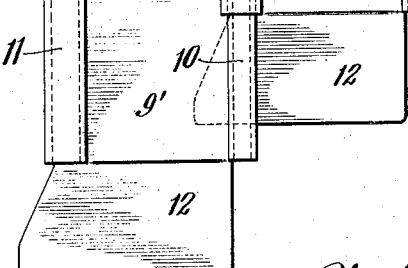
INVENTOR
RALPH SADLEIR FALKINER
BY
E. C. Sanborn
ATTORNEY Patented Oct. 24, 1933

1,931,531

UNITED STATES PATENT OFFICE 1,931,531

FLEXIBLE TRACKWAY

Ralph Sadleir Falkiner, Melbourne, Australia

Application August 19, 1931. Serial No. 557,957

1 Claim. (Cl. 305—10)

This invention has for its prime object the provision of a flexible track or railway for trailers and similar vehicles, which track shall be of simple construction, comparatively inexpensive to manufacture, and at the same time highly effective in accomplishing its functions. I shall describe in the ensuing specification embodiments of my invention and shall point out the novel features thereof in claim.

In the accompanying drawings:

Fig. 1 is a view in side elevation showing a trailer cart equipped with an embodiment of my invention.

Figs. 2 and 3 are inner plan views showing adjacent links of the trackway in different relative positions.

Fig. 4 is a fragmentary view in side elevation, partly in vertical section, and on an enlarged scale, showing in further detail the relation of the trackway to a wheel to which the trackway is applied.

Fig. 5 is a detail vertical sectional view of one of the links.

Fig. 6 is a detail sectional view on line 6—6 of Fig. 5.

Fig. 7 is a detail view showing a blank from which a link is cut out.

Fig. 8 is a detail view illustrating the manner of assembly of the links.

Fig. 9 is a detail view showing a modified form of the invention.

Fig. 10 is a detail view showing a further modification.

Fig. 11 is a detail view showing still another modification, and

Fig. 12 is a sectional view of a detail, taken on line 12—12 of Fig. 1.

Referring to the drawings, there is shown at 2 a cart or trailer, such as is commonly employed for transporting sugar cane from the fields to the mill, said carts being also used as trailers attached to harvesting machines. Such carts are usually provided with three wheels 3, 4, and 5 on each side, the main axle of the cart being shown at 6, and the axles of the wheels 3, 5, on each side of the wheel 4 being mounted in a member 7 pivotally supported on said main axle. Such arrangement is conventional and well-known in the art.

My trackway 8 is made up of links 9 each of which may be identical with every other. Said links are of sheet metal and each comprises a main body portion 9', an end portion 10 rolled over to form a pintle, and an opposite end portion 11 rolled over to form an element for receiving the pintle 10 of an adjacent link. Each link further includes side portions 12, 12 turned substantially at right angles to the main body portion. The end portions of the sides 12, 12 adjacent the pintle receiving element 11 of each link are shown spread laterally outwardly away from the main body portion 9' of the link as indicated at 13, 13; and between said laterally extending end portions are received the end portions of the adjoining link adjacent the pintle 10 of the latter. Said portions 13, 13 have punched or otherwise formed therefrom near their ends laterally inwardly extending projections 14, 14. The end portions of the sides 12, 12 adjacent the pintle 10 have parts thereof below said pintle bent or pressed laterally inwardly as indicated at 15, 15 and the latter have punched or otherwise formed therefrom laterally outwardly extending projections 16, 16. The respective projections 14, 16 by their engagement with each other, limit relative angular movement in one direction between adjacent links as will be apparent from Figs. 2, 3, and 4. Relative angular movement of adjacent links in the other direction is limited by the engagement of the end 11' of the pintle receiving element 11 of one link with the under side of the body portion 9' of the adjoining link.

It will be noted that the pintle 10 and pintle receiving element 11 of adjoining links provide effectively for flexibly connecting the links together without the necessity of providing separate hinge pins and at the same time maintain close contact with each other in their various relative angular relations so that entry of dirt, or pieces of rock or gravel or the like, between adjacent links is prevented. At the same time the links may be made expeditiously and economically from sheet metal. Thus, in Fig. 7 there is shown a sheet metal strip 17 from which a blank for the forming of a link has been cut or stamped out as indicated at 18. The ends of the blank may then be readily rolled to form the pintle 10 and pocket 11. As shown in Fig. 8, similar blanks with their ends formed into pintles 10 and pockets 11 may be readily shifted into assembled relation to each other by sliding the pintle of one into the receiving loop or pocket 11 of the other; the sides 12 being thereafter turned through 90° into their final positions and suitably formed with the lateral portions and projections hereinbefore described. The sides 12 of each link are shown cut away as at 12' so that they will not project beyond the outer surface of the main body portion of the adjacent link as the links angle relatively to each other. The main body portions of the links may if desired, be crimped both longitudinally and transversely for reinforcing purposes, as indicated at 19, 20, respectively. If desired, the pintle 10 may be rolled solid as indicated in the modified form of the invention shown in Fig. 9.

The peripheries of the wheels 3, 4, and 5 travel on the main body portions of the links and may be provided with notches 21 for accommodating the pintle receiving elements 11, said notches being sufficiently large to provide ample clearance compensating for any looseness or variation in length of the trackway. Alternatively, the notches 21 may be omitted and the wheels caused to travel on crimps 22 extended at least to a level with the outer surface of said pintle receiving elements, as indicated in Fig. 10.

As shown in Fig. 11, the main body portion of each of the links may be formed with a camber or convexity extending both transversely and longitudinally, thus facilitating turning of the vehicle and its trackway.

To prevent mud or dirt from collecting in the trackway, a plate 23 may be mounted on the wheel axles at each side of the vehicle and may extend below the side portions 12 of the track links as indicated.

The two links last assembled, completing the chain, may be conveniently fastened together by a bolt 24, inserted thru their engaged pintle 10 and receiving loop 11, as indicated in Figs. 4 and 12.

While my invention is particularly useful in conjunction with trailers or carts employed in sugar plantations it will be evident that the utility of the invention is not limited to any paricular type of vehicle.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

An endless trackway for vehicles, said trackway comprising a series of links each of which consists of an integral structure comprising a pintle formed at one end and a pintle receiving element at the other end, and also having side portions extending substantially at right angles to its main body portion, and lugs extending from said side portions at one end and cooperating with lugs on the side portions of the adjoining link for limiting relative rotation of adjacent links in one direction, relative rotation of said links in the opposite direction being limited by engagement of the pintle receiving element of one of said links with the main body portion of the other.

RALPH SADLEIR FALKINER.